May 8, 1945.  W. M. BURA  2,375,620
GRINDING MACHINE
Filed July 11, 1941  2 Sheets-Sheet 1

INVENTOR.
Walter Mark Bura
BY
ATTORNEYS

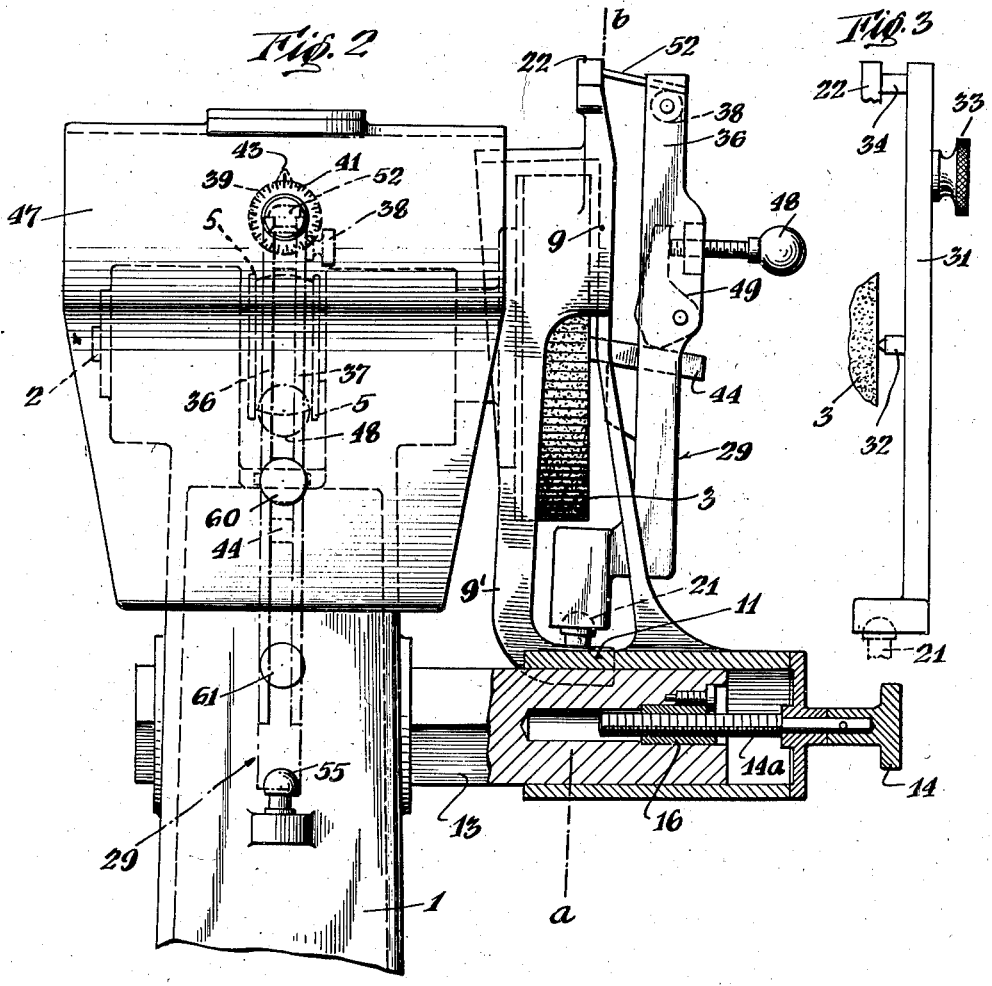

Patented May 8, 1945

2,375,620

UNITED STATES PATENT OFFICE 2,375,620

GRINDING MACHINE

Walter Mark Bura, West Orange, N. J., assignor to Norton Company, Worcester, Mass., a corporation of Massachusetts Application July 11, 1941, Serial No. 401,935

12 Claims. (Cl. 51—127)

This invention relates to grinding machines and has for an object the provision of apparatus and method for the precise generation of the form of tools and tool bits and the like for use in machine tools and the geometrically accurate tool bits formed thereby.

In modern machine tool practice, tool bits are required having accurate clearance angles both at the front and one or both sides thereof which bits in many cases must also be formed with very accurate contours (as viewed for example from above). It is necessary in most cases to provide different angles of clearance at the front end of the tool from those on the sides.

In most instances the corners of the cutting bit are rounded, the radius of curvature of the rounded corner corresponding to the requirements of the particular use to which the tool is to be put, said radius being constant or varying. It will be readily understood that if the angle of clearance at the front of the tool, viz., at the point where the rounding begins, is different from the angle of clearance at the side of the tool, viz., where the rounding ends, it will be necessary to gradually change the angle of clearance (as seen in a vertical cross-section taken along the radius of curvature at the point in question) from one extremity of the rounded corner to the other.

It is an object of the present invention to provide a tool bit and a method and suitable apparatus for forming it in which the angle of clearance is gradually changed from one portion of the tool to another.

Another object is to provide a tool bit, and a method and apparatus for forming it, having at least one rounded corner the form of the corner being such that the clearance angle in a vertical plane generally longitudinally of the tool is substantially identical at all points around said rounded corner.

It is another object to provide a method and apparatus for forming such tool bits capable of operation by unskilled workmen in such a way that geometrically accurate tool bits may be formed.

It is another object of the invention to provide a method and apparatus whereby the contour of a tool bit on the end and both sides thereof either with or without connecting curves may be accurately formed under the control of a pattern.

It is another object to provide a method and apparatus whereby a tool bit may be formed in which the clearance or relief angle is gradually changed from one portion of the tool to another while the contour thereof is being formed either with or without the use of a controlling pattern or template.

Another object of the invention is to provide a method and apparatus for quickly and accurately forming the controlling pattern or template.

These and other objects and advantages of this invention will be apparent from the following specification and the accompanying drawings of a possible illustrative embodiment of the invention as applied to a machine of the type shown in United States Patent to Oliver 2,231,217. While the form of construction selected to illustrate the principle of the invention is similar in certain respects to the construction disclosed by said Oliver patent, it is to be understood that the present invention may be embodied in various other forms of construction. In said drawings:

Fig. 2 is a partial side elevation thereof as viewed from the left hand side of Fig. 1;

Fig. 3 shows a wheel dressing diamond fixture;

Fig. 4 is a rear end view of a template or controlling pattern useful with the machine; and Fig. 5 is a plan view thereof.

Figure 1:
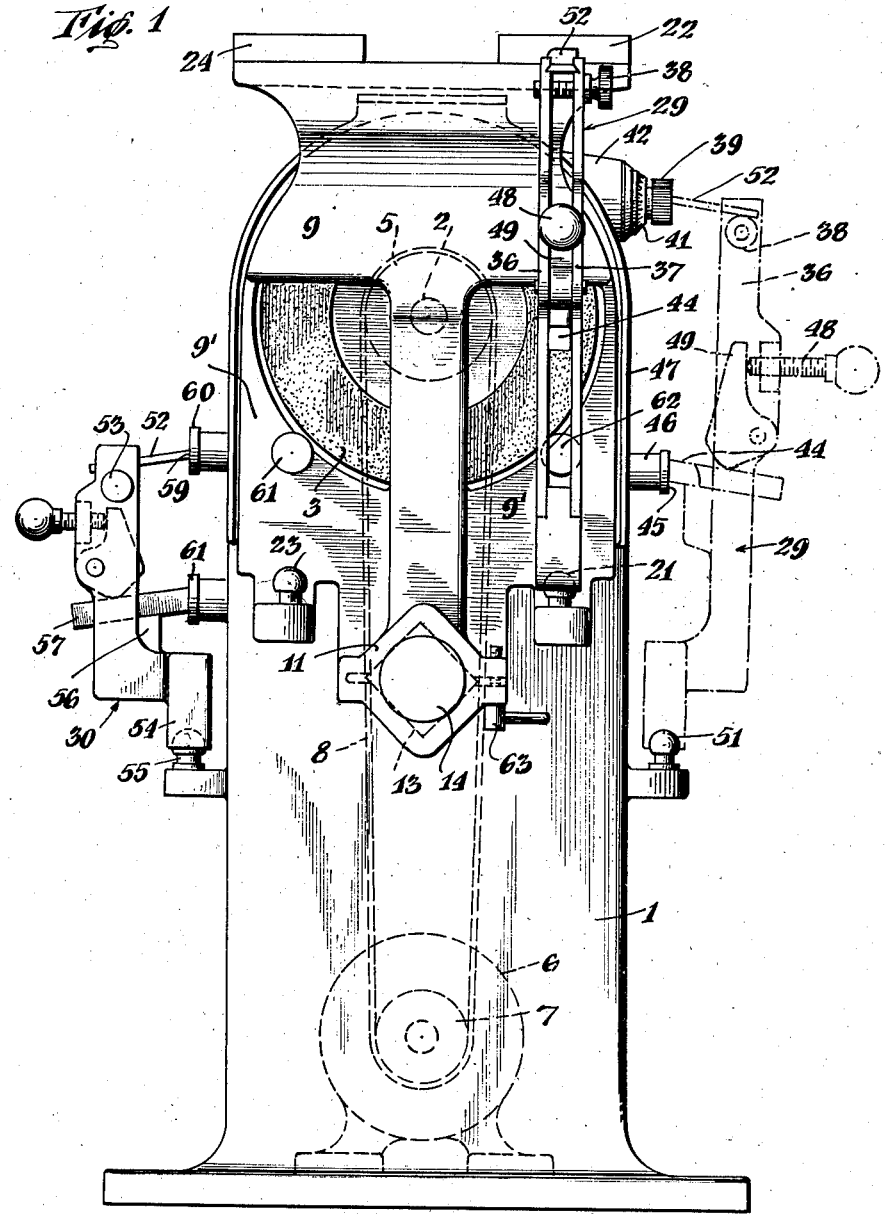
Fig. 1 is a side elevation of such a machine.

In the preferred form shown, the machine may consist of a base 1 at the upper end of which is a spindle 2 having on at least one end thereof a cupped grinding wheel 3. The spindle 2 is driven by a pulley 5 in the head of the machine directly belted by a belt 8 to a pulley 7 of a motor 6 mounted in the base. The grinding wheel is thus constantly driven in the operation of the machine. In front of the wheel 3 is a guard 9 which, as will be understood from Fig. 1, is shaped to expose a portion of the grinding wheel face and against which exposed portion the tool (or template) to be formed is to be held.

The wheel guard is mounted on a carriage 11 which is slidable on a square rod 13 and movement of the carriage on the standard 13 is produced by means of a knob 14 which is attached to a screw 14a (Fig. 2). The screw engages in a nut 16 fixed in the end of the square rod 13 so that rotation of the screw element by the knob will move the carriage 11 toward or from the grinding wheel. It is thereupon clamped in place by any suitable means such as the clamping screw 63 (Fig. 1).

The machine illustrated is so constructed that it can only grind tools having a side clearance of 1½° and a front clearance of 10°. It is to be understood however that the machine and its accessories may be readily modified to provide for other desired angles. Thus, if it is desired to vary the angle of side clearance, the wheel guard 9 may be mounted upon the carriage 11 by a tiltable connection, such as that shown in the Oliver patent, and if it is desired to vary the angle of front clearance the tool holder to be described later would be so formed as to permit tiltable adjustment of the tool bit therein.

The downwardly extending portions 9' of the wheel guard are provided with forward extensions carrying hemispherical fixture supporting knobs 21 and 23.

Three fixtures may be utilized with the machine—namely, the tool grinding fixture 29 shown at the right side of Fig. 1, the template grinding fixture 30 shown at the left side of Fig. 1 and the wheel dressing fixture 31 shown in Fig. 3. The fixture 31 has a depression at its lower end to fit the knob 21 and has a diamond dresser 32 which in the form illustrated is exactly one-half way between the element 34 at its upper end and the center of the knob 21. The wheel dresser has a handle element 33 and at the top a short end portion 34 which fits against the abutment 22 carried by the wheel guard. The grinding wheels may be dressed with the wheel dresser in position on the wheel guard by feeding the carriage 11 in until the diamond dresser 32 comes into contact with the face of the wheel, then the carriage 11 is locked with clamp screw 63. The carriage is never moved except for dressing the wheel. This fixture, as previously stated, is removable and one of the other fixtures placed upon the knob 21 or knob 23.

The fixture 29, for instance, shown at the right hand side of Fig. 1, is for holding the tool bit and a template. With this fixture a template of twice the desired size to which the tool is to be ground is positioned in the top of the fixture as is shown at 52 in Fig. 1. The upper end of the fixture is formed of two spaced parts 36 and 37 and has wedge shaped grooves at the top to receive the template 52, the screw 38 being provided to securely clamp the template in place when adjusted.

It will be noted from Fig. 1 particularly that the template 52 is set with its outermost point in engagement with the vertical plane face of the knob 39 and is clamped in place by means of said screw 38 which draws the two side bars 36 and 37 together. The knob 39 has a micrometer dial 41 thereon and is threaded in the portion 42 of the wheel housing 47. If it is desired to remove say .010" from the tool bit the knob is turned out until .010" shows opposite the zero mark at 43. Then, as the template 52 is held against the vertical surface of the knob, the tool bit shown at 44 in Fig. 1 is pushed inwardly against the flat finished surface 45 provided on the lug 46 formed on the wheel housing 47. The tool bit is then clamped in place by means of the screw 48 and the lever 49 which holds the bit in the seat provided therefor in the fixture 29 at the prescribed angle, say tilted upwardly 8½° to a line at right angles to a line from the center of knob 51 to the surface 45. When this adjustment has been made, the fixture 29 with its template and tool bit are removed from its dotted line position on the knob 51 in Fig. 1 and is placed on the knob 21 (or knob 23) with the template 52 in position for engagement with the abutment surface 22 while the tool bit itself will engage the wheel at the same point as that occupied by the wheel dresser 32 when the wheel was being dressed. With the template 52 opposite the straight edge 22, the tool bit will engage the wheel until it has been ground sufficiently to permit the template to contact the straight edge. The fixture is rocked on the knob 21 during the grinding so that all points of the cutting edge will contact the wheel until sufficient metal has been removed to permit contact of all points of the template with the abutment 22 (or 24). Such rocking of the fixture produces a shape on the tool bit corresponding to the shape of the template except that the finished tool bit will be one-half the size of the template.

What I have hereinbefore termed the "wheel guard" 9, which practically covers the periphery of the wheel and a portion of the face thereof may, insofar as the invention herein described is concerned, be merely a frame element carrying the ball knobs 21 and 23, and straight edges 22 and 24.

A template may be made with the machine of a size twice the size of the tool and usable in the fixture 29 in the grinding or regrinding of like tools. The template forming fixture is shown at 30 (Fig. 1) and is constructed at the upper end similar to the upper end of the fixture 29 in which a template blank 52 is clamped by means of a screw 53 similar to the screw 38 of the fixture 29. The fixture 30 includes a base 54 having a socket for the supporting knob 55 and also has intermediate its ends a holder 56 for a tool 57. This may be a new tool of accurate form, for instance, the form indicated by dotted lines 58 of Fig. 5. The tool is mounted in the fixture 30 and the fixture placed on the knob 55 as shown in Fig. 1 with the forward end 59 of the template blank in engagement with the finished face of the lug 60 and with the tool in engagement with the finished face of the lug 61 on the side of the machine. When the tool has thus been adjustably fixed in place, the fixture 30 is removed from the knob 55 and placed on one of the ball knobs 21 or 23 of Fig. 1.

It is to be noted that the distance from the template 52 to the axis of the socket 55 of the fixture 30 is equal to the distance from the center of the knob 51 to the point of engagement of the tool 44 with the face 45 of the lug 46 and that the point of the tool 57 is half way between the template 52 and axis of the socket 55. Thus, when the fixture 30 is mounted on the knob 23, the finished tool edge will contact a finished face of the lug 61 on the left side of the machine or lug 62 on the right side of the machine if the fixture 30 be mounted on the knob 21. Thus when the fixture 30 is mounted on the knob 23 or 21 the edge of the tool 57 engages the lug 61 or 62 and the template 52 is in position to engage the grinding wheel face and by rocking the fixture on the knob the template is ground away to the extent permitted by reason of engagement of the tool with the surface 61 or 62.

Whatever the form of the tool, for instance the form indicated by the dotted line 58 of Fig. 5, the template will be ground to the same form but twice the size, thereby adapting the template for use in the fixture 29 for the regrinding of tools to conform exactly in size and shape to the cutting face of the tool 57 which was used as a pattern therefor.

It will thus be seen that when the tool bit 44 is in place in fixture 29 and said fixture is placed upon the knob 21 or knob 23, the angle of front clearance will be the angle of upward tilt of the tool bit 44 in the fixture 29 (8½° in the present case) plus the angle between the plane of the face of the wheel 3 and a plane intersecting the center of spherical knob 21 and the front face of the surface 22 (see line *a—b* Fig. 2) (viz., 1½° in the present case), or a total of 10°. However, as the fixture 29, assuming it to be supported on the left knob 23, is rocked to the left to form the large radius of the contour 58, the effect of the upward tilt of the tool bit in the fixture 29 gradually decreases and completely disappears when the fixture 29 has been turned through 90° so that the clearance at the side of the tool is only 1½° in the form shown. Likewise by using the knob 21 the right side of the tool bit may be ground to the same clearance. Thus, the clearance of the tool bit as viewed in a vertical plane at right angles to any part of the cutting edge gradually changes from the desired angle of front clearance to the desired side clearance in infinitely small steps. This gradual variation of the clearance angle occurs automatically and can therefore be achieved by relatively unskilled operators.

Another interesting and most important characteristic of the conformation of the rounded portion of the tool produced by the method and apparatus described is that the clearance angle at any point of a rounded corner when measured in generally vertical planes longitudinally of the tool, remains constant, the ideal conformation particularly for tool bits of the plunge cut type. This conformation is ideal because the individual parts of the work approach the tool (in latches of usual construction) and as the clearance should be neither too great nor too small the ideal desideratum is to hold the clearance in such longitudinal vertical planes constant at all points of the rounded corner or corners.

It is also contemplated to provide such a machine with means for varying the angle of side clearance as well as the angle of front clearance. To vary the side clearance any suitable construction for tilting the wheel guard 9 and the parts carried by it relative to the plane of the face of the grinding wheel 3 may be provided. One suitable form of construction is that shown in the Oliver patent. Variation in the angle of side clearance will of course automatically vary the front clearance. The angle of front clearance may be further varied by varying the angle of tilt of the tool bit relative to the fixture 29. One convenient way to vary this angle is by placing under the tool bit a convex segment, such as is commonly used for the same purpose under tool holders as used in lathes. Such a segment would of course rest in a correspondingly formed concave seat. It is also possible to vary the side clearance on one side from the clearance on the other side. This may be done by suitably twisting the tool bit about its longitudinal axis.

It is, of course, possible to use said device without using the template or controlling pattern in which event the contour developed will be dependent upon the skill of the operator. However, the clearances and the variation thereof by infinitely small steps from the front to the sides will be formed automatically by the machine.

It will be noted that the means shown and described will serve admirably to accomplish the objects stated above. It is to be understood, however, that the constructions disclosed above are intended merely as illustrative of the invention and not as limiting as various other modifications therein may be made without departing from the invention as defined by a proper interpretation of the claims which follow.

I claim:

1. In a machine for grinding tool bits, a base, a shaft journaled relative thereto, a grinding wheel on said shaft, a supporting knob arranged adjacent said wheel and rearwardly of the plane of the face thereof, a tool holder having a seat adapted to rest upon said knob and having means for holding a tool bit with its cutting end tilted upwardly relative to a line from said seat to the cutting end of the tool bit, whereby the tool bit may be ground with front and side clearances as the tool holder is swung relative to the plane of the face of the wheel while supported on said knob, the clearance varying gradually from the front to the side of the tool bit, the side clearance being determined by the angle between said line and the plane of the face of said wheel, and the maximum front clearance being equal to the sum of this angle plus the angle between the tool bit and a second line at right angles to the first line.

2. In a machine for grinding tool bits, a base, a shaft journaled relative thereto, a grinding wheel on said shaft, a supporting knob arranged adjacent said wheel and rearwardly of the plane of the face thereof, a tool holder having a seat adapted to rest upon said knob and having means for holding a tool bit with its cutting end tilted upwardly relative to a line from said seat to the cutting end of the tool bit and having a controlling template, and an abutment surface for said template, whereby the tool bit may be ground to a contour controlled by said template and with front and side clearances as the tool holder is swung relative to the plane of the face of the wheel while supported on said knob, the clearance varying gradually from the front to the side of the tool bit, the side clearance being determined by the angle between said line and the plane of the face of said wheel, and the maximum front clearance being equal to the sum of this angle plus the angle between the tool bit and a second line at right angles to the first line.

3. In a machine for grinding tool bits, a base, a shaft journaled relative thereto, a grinding wheel on said shaft, a spherical supporting surface arranged adjacent said wheel and rearwardly of the plane of the face thereof, a tool holder having a seat adapted to rest upon said spherical supporting surface and having means for holding a tool bit with its cutting end tilted upwardly relative to a line from said seat to the cutting end of the tool bit, whereby the tool bit may be ground with front and side clearance as the tool holder is swung relative to the plane of the face of the wheel while supported on said spherical supporting surface, the clearance varying gradually from the front to the side of the tool bit, the side clearance being determined by the angle between said line and the plane of the face of said wheel, and the maximum front clearance being equal to the sum of this angle plus the angle between the tool bit and a second line at right angles to the first line.

4. In a machine for grinding tool bits, a base, a shaft journaled relative thereto, a grinding wheel on said shaft, a supporting knob arranged adjacent said wheel, a tool holder having a seat adapted to rest upon said knob and having means for holding a tool bit with its cutting end tilted upwardly relative to a line from said seat to the cutting end of the tool bit, whereby the tool bit may be ground with front and side clearances as the tool holder is swung relative to the plane of the face of the wheel while supported on said knob, the clearance varying gradually from the front to the side of the tool bit, the side clearance being determined by the angle between said line and the plane of the face of said wheel, and the maximum front clearance being equal to the sum of this angle plus the angle between the tool bit and a second line at right angles to the first line.

5. In a machine for grinding tool bits, a base, a shaft journaled relative thereto, a grinding wheel on said shaft, a supporting knob arranged adjacent said wheel, a tool holder having a seat adapted to rest upon said knob and having means for holding a tool bit with its cutting end tilted upwardly relative to a line at right angles to the second line from said seat to the cutting end of the tool bit and having a controlling template, and an abutment surface for said template, whereby the tool bit may be ground to a contour controlled by said template as the tool holder is swung relative to the plane of the face of the wheel while supported on said knob, the clearance varying gradually from the front to the side of the tool bit, the side clearance being determined by the angle between said second line and the face of said grinding wheel and the maximum front clearance being equal to the sum of this angle plus the angle between the tool bit and the first line.

6. In a machine for grinding tool bits, a base, a shaft journaled relative thereto, a grinding wheel on said shaft, a supporting knob arranged adjacent said wheel, a tool holder having a seat adapted to rest upon said knob and having means for holding a tool bit with its cutting end tilted upwardly relative to a line at right angles to a second line from said seat to the cutting end of the tool bit, whereby the tool bit may be ground as the tool holder is swung relative to the plane of the face of the wheel while supported on said knob, the clearance varying gradually from the front to the side of the tool bit, the side clearance being determined by the angle between said second line and the face of said grinding wheel and the maximum front clearance being equal to the sum of this angle plus the angle between the tool bit and the first line.

7. In a machine for grinding tool bits, a base, a shaft journaled relative thereto, a grinding wheel on said shaft, a support, a tool holder, a universal joint connection between the tool holder and the support, the tool holder having means for holding a tool bit with its cutting end tilted upwardly relative to a line at right angles to a second line from said joint to the cutting end of the tool bit, whereby the tool bit may be ground as the tool holder is swung about said universal joint relative to the plane of the face of the wheel, the clearance varying gradually from the front to the side of the tool bit, the side clearance being determined by the angle between said second line and the face of said grinding wheel and the maximum front clearance being equal to the sum of this angle plus the angle between the tool bit and the first line.

8. That method for grinding tool bits which comprises the steps of placing a tool bit in a tool holder with its cutting end tilted upwardly, placing the tool holder on a support lying to the rear of the plane of a plane grinding surface and moving said tool holder upon said support while grinding the end of the upwardly tilted tool bit and at least one side thereof upon said grinding surface.

9. The combination according to claim 2, in which the template on said tool holder is mounted parallel to the tool bit, and is formed with end and side clearances corresponding to those desired on the tool bit, whereby said template makes line contact with said abutment surface when the tool bit is ground to shape and the tool holder is swung relative to the plane face of the wheel.

10. The combination according to claim 5, in which the template on said tool holder is mounted parallel to the tool bit, and is formed with end and side clearances corresponding to those desired on the tool bit, whereby said template makes line contact with said abutment surface when the tool bit is ground to shape and said tool holder is swung relative to the plane of the face of the wheel.

11. In a machine for sharpening worn tool bits and the like to original contour, comprising a frame, a grinding wheel rotatably supported therein for rotation on a longitudinal axis, a fixture for holding the tool bit, having at one end a template parallel to the tool bit and having a contour and front and side clearances desired to be formed on the tool, and at the opposite end a socket, the tool bit being positioned exactly centrally between the template and the axis of the socket, a frame element carried by the machine, means for supporting the fixture on the machine to adjust the tool to provide for the amount of material to be ground from the face of the tool, means on the frame comprising a ball element on its lower end, and a straight edge on the frame element engageable by the template when the fixture is supported on the frame, the tool bit and template having their forward ends tilted slightly upwardly relative to a plane normal to a straight line between the center of said ball element and said straight edge, the template engaging the straight edge with line contact as the grinding proceeds and the rocking of the fixture on the ball element with the template engaging the straight edge shaping the tool to correspond to the contour of the template and with side clearance determined by the angle between said line and the face of said grinding wheel, and a front clearance equal to this angle plus the angle between said tool and a second line at right angles to the first line.

12. In a machine for grinding of worn tool bits, a frame, a rotatable grinding wheel having a flat face, a fixture including a template at one end, a means for holding the tool, and a socket at the opposite end, a ball-like element on the machine for supporting said socket, a straight edge surface in fixed relation with the ball element for engagement with the template when the socket is mounted on the ball and the worn edge of the tool is positioned in engagement with the grinding wheel, the axis of said socket, said grinding wheel face, and said straight edge surface being positioned along a straight line, and said tool and said template being tilted upwardly relative to the axis of the fixture, whereby the rocking of the fixture on an axis parallel with said line and with the template in contact with the straight edge presenting various portions of the tool edge to the grinding wheel, forms a cutting edge contour corresponding to the face of the template engaging the straight edge and with a side clearance determined by the angle between said line and the face of said wheel, and a front clearance equal to the sum of this angle plus the angle between the tool and a second line at right angles to the first line.

WALTER MARK BURA.

CERTIFICATE OF CORRECTION.

Patent No. 2,375,620.

May 8, 1945.

WALTER MARK BURA.

It is hereby certified that error appears in the printed specification of the above numbered patent requiring correction as follows: Page 3, first column, line 24, for the word "latches" read --lathes--; and that the said Letters Patent should be read with this correction therein that the same may conform to the record of the case in the Patent Office.

Signed and sealed this 27th day of November, A. D. 1945.

(Seal)

Leslie Frazer
First Assistant Commissioner of Patents.